(12) United States Patent
Silk et al.

(10) Patent No.: US 11,727,019 B2
(45) Date of Patent: *Aug. 15, 2023

(54) SCALABLE DYNAMIC ACRONYM DECODER

(71) Applicant: Capital One Services, LLC, McLean, VA (US)

(72) Inventors: Erik Silk, Reston, VA (US); Basim Partovi, Derwood, MD (US); Ahmad Hassan Ibrahim, Centerville, VA (US)

(73) Assignee: Capital One Services, LLC, McLean, VA (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/338,789

(22) Filed: Jun. 4, 2021

(65) Prior Publication Data

US 2021/0294812 A1 Sep. 23, 2021

Related U.S. Application Data

(63) Continuation of application No. 16/416,719, filed on May 20, 2019, which is a continuation of application No. 16/151,844, filed on Oct. 4, 2018, now Pat. No. 10,339,150.

(51) Int. Cl.
| | |
|---|---|
| *G06F 16/2457* | (2019.01) |
| *H04L 9/40* | (2022.01) |
| *G06F 9/455* | (2018.01) |
| *G06F 9/54* | (2006.01) |
| *G06N 20/00* | (2019.01) |
| *G06F 16/248* | (2019.01) |
| *G06F 16/9535* | (2019.01) |
| *G06F 9/451* | (2018.01) |

(52) U.S. Cl.
CPC ........ *G06F 16/24578* (2019.01); *G06F 9/451* (2018.02); *G06F 9/45558* (2013.01); *G06F 9/54* (2013.01); *G06F 16/248* (2019.01); *G06F 16/9535* (2019.01); *G06N 20/00* (2019.01); *H04L 63/08* (2013.01); *H04L 63/105* (2013.01); *G06F 2009/4557* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 10,339,150 B1* | 7/2019 | Silk | G06F 16/24578 |
| 11,055,297 B2* | 7/2021 | Silk | G06F 9/45558 |
| 11,386,086 B2* | 7/2022 | Purcell | G06F 16/24544 |
| 2020/0073986 A1* | 3/2020 | Purcell | G06F 16/21 |
| 2020/0110753 A1* | 4/2020 | Silk | G06F 16/9535 |
| 2021/0294812 A1* | 9/2021 | Silk | G06F 9/451 |

* cited by examiner

*Primary Examiner* — Kim T Nguyen
(74) *Attorney, Agent, or Firm* — KDW Firm PLLC

(57) ABSTRACT

Various embodiments are generally directed to a dynamic, flexible acronym decoder. A user may submit a query via one of a plurality of user interfaces. Information describing the user may be received to generate a context vector for the user. The query may be processed against a database of terms using the context vector, a machine learning model, and content tags applied to terms in the database. Processing the queries against the database may return a result set, and the ML model may be used to compute a score for each result. The results may be ordered based on the scores and returned as responsive to the query.

20 Claims, 10 Drawing Sheets

Client Device 102

Crawler has identified the following new acronym: "PATAPP"

Suggested Term: | Patent Application  301 |

Please review suggested definition here:

| An application for patent filed with a governmental entity. 302 |

Please review suggested content tags here:

| Legal 303 |   | Invention 304 |   | Technology 305 |

| Submit 306 |

Success! "PATAPP" has been added to the system as an acronym for "Patent Application".

SCALABLE DYNAMIC ACRONYM DECODER

RELATED APPLICATIONS

This application is a continuation of U.S. patent application Ser. No. 16/416,719, filed May 20, 2019, which is a continuation of U.S. patent application Ser. No. 16/151,844 (now patent Ser. No. 10/339,150), filed Oct. 4, 2018, both titled "SCALABLE DYNAMIC ACRONYM DECODER". The contents of the aforementioned applications are incorporated herein by reference.

TECHNICAL FIELD

Embodiments herein generally relate to computing services, and more specifically, to a scalable, dynamic, acronym decoder.

BACKGROUND

In any organization, whether it is professional, educational, or recreational, members struggle to learn the organization's local parlance. The longer an organization has existed, the more the organization generates terms and acronyms specific to it. As such, all members of the organization, from the newest members to the most senior members, waste valuable time asking questions and searching for the meaning of an oft-referenced term or acronym on the organization's intranets (or even the Internet). Further complicating matters is that within a given organization, an acronym or term may have different meanings to different subdivisions within the organization. As such, a user may find a definition of a term or acronym only to later discover that the definition was incorrect given the user's context.

BRIEF DESCRIPTION OF THE DRAWINGS

FIGS. 3A-3B depict examples of a scalable dynamic acronym decoder.

DETAILED DESCRIPTION

Figure 1:
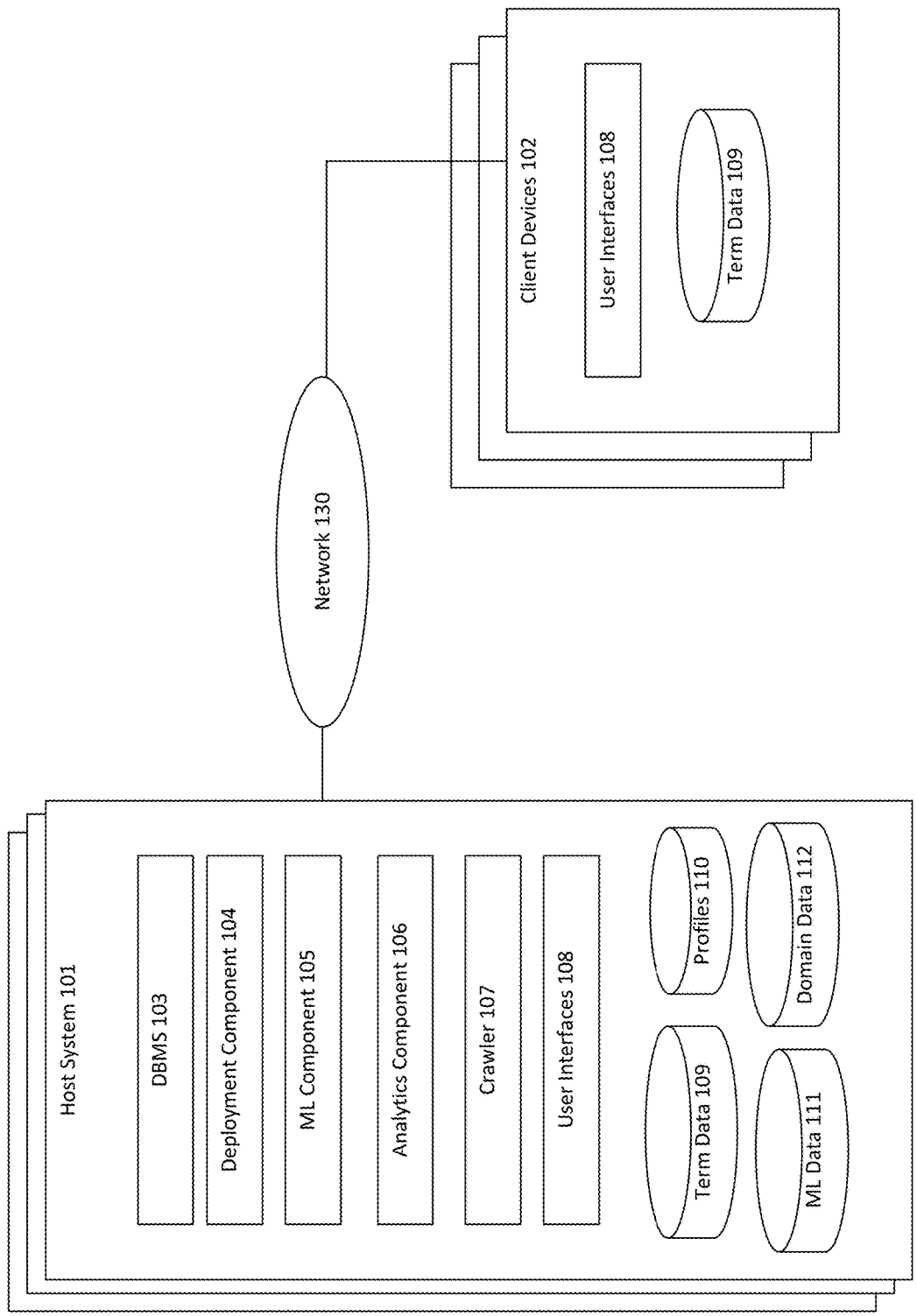
FIG. 1 illustrates an embodiment of a system.

Embodiments disclosed herein provide robust solutions for a lightweight, easily deployed system through which users can instantaneously reference acronym and term definitions that are specific to their context (e.g., role, company, industry, etc.). When a user searches a term, database results are weighted by matching, fuzzy matching, general popularity of a given result, and relevance specific to the user's context. Furthermore, embodiments disclosed herein leverage machine learning to identify new terms, generate proposed definitions for new terms (or existing terms having new definitions), and generate content tags for new and/or existing terms. Additionally, users may access the definitions through one or more different user interfaces, such as a standalone application, web page interface, web browser extension, smartphone application, and a chatbot interface that responds to user queries with definitions.

Advantageously, embodiments disclosed herein allow organizations to easily organize all definitional content in one place, where the system dynamically identifies new terms, identifies existing terms having new definitions, and generates proposed definitions for new and/or existing terms. Doing so improves the performance of the system by reducing the amount of computing resources required to provide user interfaces for manually adding, editing, and removing term definitions. Furthermore, users can access content in clean, simple, user interfaces that can be stored internal to the organization to prevent the public disclosure of proprietary information.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes one or more host systems 101 and one or more client devices 102. The host systems 101 are representative of any type of computing system or device, such as servers, compute clusters, cloud computing environments, and virtualized computing systems. The client devices 102 are representative of any type of computing device, such as desktop computers, laptops, smartphones, tablets, and the like.

As shown, the host system 101 includes a database management system (DBMS) 103, a deployment component 104, a machine learning (ML) component 105, an analytics component 106, a crawler 107, user interfaces 108, a term data 109, a database of user profiles 110, data stores of ML data 111, and data stores of domain data 112. The DBMS 103 is generally configured to create and manage databases, providing users and applications with interfaces to create, retrieve, update, and manage data (e.g., in the term data 109). The term data 109 is a data store configured to store definitions of terms where the definitions may be specific to a given domain (e.g., a business, educational institution, governmental entity, etc.). The term data 109 may be any type of data store, such as a flat file, database, and the like. In some embodiments, the DBMS 103 may include a Node.js® runtime environment providing access to instances of the term data 109 on the host systems 101. As used herein, a "term" includes, but is not limited to, words, phrases, acronyms, and abbreviations. The definitions stored in the term data 109 may include multiple definitions for a given term. Furthermore, multiple organizations may have access to the term data 109. As such, based on the context within the given organization, a term may have different definitions across different organizations.

Furthermore, each definition may be tagged with content tags to facilitate contextual searches and fuzzy matching to process queries submitted by users via the user interfaces 108. Further still, each term in the term data 109 may include a security level information element specifying a level of security clearance required to access the term. For example, highly classified information may be tagged with the highest security level, while public information may be tagged with the lowest security level.

The deployment component 104 is configured to manage the system 100, e.g., by scaling virtual instances of the host system 101 based on current loads of the system 100. Generally, as the load increases (e.g., when users are submitting increased numbers of queries to the DBMS 103), the deployment component 104 may provide more virtual instances of the host system 101. Similarly, as load decreases, the deployment component 104 may remove virtual instances of the host system 101.

The ML component 105 provides machine learning techniques for the host system 101 based on the ML data 111. The ML data 111 may include ML models, ML algorithms, and/or training datasets. Examples of ML algorithms and/or ML models include classifiers, decision trees, neural networks, and the like. For example, using machine learning, the ML component 105 may identify new terms in the domain data 112, generate definitions for the new terms, and generate content tags for the new terms. The DBMS 103 may then generate and/or update a corresponding record in the term data 109. As another example, the ML component 105 may identify a new definition for a term that has at least one definition in the term data 109, as definitions of terms may evolve or change over time.

In another example, the ML component 105 may generate content tags for terms in the term data 109. Some terms in the term data 109 may be manually tagged with content tags by users. The manual tags and indications of the tagged terms may be stored as training data in the ML data 111. The ML component 105 may leverage the manual tags as classification learning data along with data collected by the analytics component 106 (e.g., types of searches submitted by users, metadata describing the users submitting queries, etc.) as training data. The ML algorithms of the ML component 105 may use the training data to generate one or more ML models that contain weights specifying how to generate tags for terms in the term data 109.

The analytics component 106 monitors the operations performed by the host system 101 and/or client devices 102 and generates use data describing the monitored operations for later use. For example, the analytics component 106 may identify which user interface 108 a user uses to submit a given query, the term specified in the query, which user submitted the query, how many search results were returned as responsive to the query, how many queries are submitted via each type of user interface (e.g., how frequently each user interface 108 is used), and the like. The analytics component 106 may store the collected data at a storage location (e.g., the ML data 111) for later use.

The profiles 110 store profile data describing each of a plurality of users in a given domain. The profile data may include, without limitation, biographical data, roles (e.g., job title), associated projects, lines of business, business units, position in an organizational chart, skills, account identifiers, teams, a security level, and a location of the user. In at least one embodiment, the profiles 110 include an organizational chart of the organization. The data stored in the profiles 110 may be accessed via one or more application programming interfaces (APIs).

The crawler 107 is configured to identify terms in the domain data 112 for inclusion in the term data 109. The crawler 107 may leverage the ML component 105 to determine whether a term identified in the domain data 112 is a new term and/or a term that has a new meaning and/or definition. Generally, the crawler 107 may process all data in the domain data 112 at periodic intervals using a natural language processing (NLP) algorithm. The data generated by the NLP algorithm may then be processed by the crawler 107 and/or ML component 105 to identify new terms therein. The domain data 112 includes any type of data that includes text, such as web pages, documents, chat rooms, forums, and the like. Once a term is identified in the domain data 112, the crawler 107 and/or ML component 105 may generate one or more proposed definitions for the term and one or more proposed content tags for the term. In at least one embodiment, the crawler 107 may include a user interface 108 that allows users to review proposed new terms and the generated definitions and/or content tags. The users may use the user interface 108 to modify and/or accept the terms, definitions, and content tags.

The user interfaces 108 are representative of any number and type of graphical user interfaces (GUI). For example and without limitation, the user interfaces 108 may include user interfaces through which a user may submit queries for processing by the DBMS 103, receive and display results from the DBMS 103, provide login credentials to authenticate their accounts, submit new term definitions and/or content tags for inclusion in the term data 109, review and/or modify term definitions and/or content tags generated by the host system 101, and the like. As examples and without limitation, the user interfaces 108 may be part of a web page, a web browser extension, a chat (or messaging) application interface, a desktop/laptop/server operating system application, and/or a mobile operating system application. For example, a user interface 108 may have dedicated GUI elements to submit search terms to the DBMS 103. As another example, the user interface 108 may allow users to select (or highlight) textual terms (e.g., with a mouse click or touchscreen input), and the user interface 108 may programmatically generate and submit a query to the DBMS 103 including the selected terms. As another example, in a messaging-based environment, the user interface 108 may analyze any text messages communicated between users to determine that a user is unaware of the definition of a term (e.g., user A messages user B "what does cos mean?"). In such an example, the user interface 108 may automatically generate a query without requiring user input, and automatically output definitions from term data 109 to user A.

As another example, the user interfaces 108 may inform users when a term has different meanings across different organizations having access to the term data 109. For example, an example term "ABC123" may have a first definition (or meaning) in a first organization, and a second definition in a second organization. In such an embodiment, if a user in the first organization is composing an email to a user in a second organization, the user interfaces 108 may output a notification to the first user that the term has a different meaning in the second organization. Similarly, when the second user views the email from the first user, the user interfaces 108 may inform the second user that the term has a different meaning across organizations.

As shown, the client devices 102 include instances of the user interfaces 108. In some embodiments, the client devices 102 include instances of the term data 109. Doing so allows users to access definitions in the term data 109 when the client devices 102 cannot access the host system 101 via the network 130 (e.g., when the client devices 102 are "offline"). In such embodiments, the term data 109 may be stored as a JavaScript® Object Notation (JSON) file on the client devices 102.

When a client device 102 submits a query 103 via the user interfaces 108, the query may include an indication of an authenticated user account (e.g., corresponding to a profile in the profiles 110) and an indication of a search term (e.g., an acronym such as "LOB"). In some embodiments, however, the user is not authenticated, as unauthenticated users may submit queries and receive results from the term data 109. The DBMS 103 (or another designated component of the system 100) may receive the query via the network 103. The DBMS 103 may reference the profiles 110 to receive information describing the user to tailor the search of terms in the term data 109 to the user's context. In one embodiment, the DBMS 103 and/or the ML component 105 generates a context vector describing the user's attributes. Stated differently, the context vector may include elements describing the user based on the data received from the profiles 110. For example, the context vector may include indications of an account identifier (e.g., a username) of the user, one or more roles of the user, one or more organizational units the user belongs to, one or more teams the user belongs to, one or more projects the user belongs to, a privacy level of the search term, a security level of the user, one or more skills of the user, one or more course of study of the user, a location of the user, a communications network (e.g., the network 130) the client device 102 submitting the query via the user interface 108 is connected to, and the like.

The DBMS 103 may then process the query according to one or more processing steps. For example, the DBMS 103 may perform a search of the term data 109 using the term (e.g., "LOB") submitted in the query. Doing so may return one or more direct matches in the term data 109. The DBMS 103 may further match the elements of the context vector to the content tags associated with the terms in the term data 109. For example, if the user's role is specified as "attorney," the DBMS 103 may return results that have content tags associated with the legal field. In some embodiments, the DBMS 103 may leverage one or more ML models of the ML data 111 to expand the query, e.g., to generate queries for similar or related terms that can be processed against the term data 109 to return additional results (e.g., to facilitate fuzzy matching).

In embodiments, the DBMS 103 may compute a score for each result returned from the term data 109, where the score reflects the relevance to the user submitting the query. In one embodiment, the ML component 105 may compute the scores for the results based on an ML model in the ML data 111 and the generated context vector. For example, the ML model may specify to apply different weights to each specific field in the context vector and the search results. For example, the ML model may weight a user's role and organizations as the first and second most heavily weighted context elements when computing the score for each result from the term data 109, while applying lower weights to the user's skills and/or projects. By computing scores in such a fashion, the DBMS 103 may provide contextual results that are tailored to the user. Once the scores are computed, the DBMS 103 may order the results based on the scores and return the highest scoring results as responsive to the query. The DBMS 103 may return the results to the client device 102, where the user interface 108 outputs the results for display.

Figure 2:
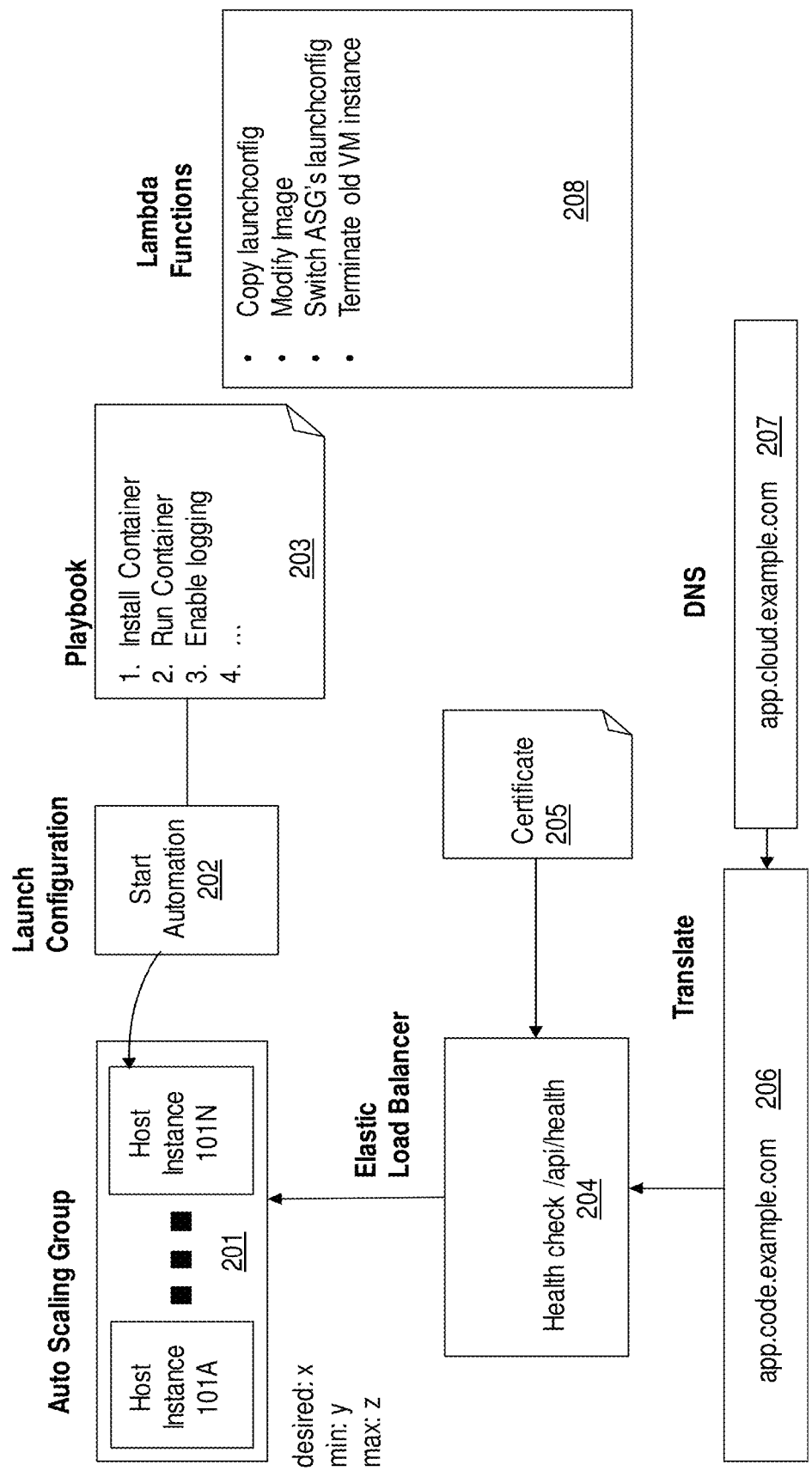
FIG. 2 illustrates an embodiment of a system.

FIG. 2 illustrates an embodiment of a system 200. Generally, the system 200 reflects one embodiment of components used by the deployment component 104 to dynamically deploy and scale instances of the host system 101 of FIG. 1, e.g., in a cloud computing environment. The elements depicted in FIG. 2 should not be considered limiting of the disclosure, as the system 200 may include any suitable configuration. As shown, the system 200 includes an auto-scaling group (ASG) 201, a launch configuration component 202, a playbook 203, an elastic load balancer 204, a certificate 205, a domain name system (DNS) component 207, and one or more lambda functions 208. The playbook 203 defines a set of commands or operations to be performed by the launch configuration component 202. For example, the playbook 203 may specify to install a container application on a compute node (not pictured) in the auto-scaling group 201, retrieve a container image for the host system 101 from an image repository, and run the image container within the container application on the compute node. The playbook 203 may further specify other commands, such as to enable logging, expose APIs, configure endpoints, etc.

The launch configuration component 202 may automate the items specified in the playbook to deploy an instance of the host system 101 in the auto-scaling group 201, depicted as instances 101A-N, where A and N are positive integers. As shown, the auto-scaling group 201 may include a desired number of instances 101A-N, a minimum number of instances 101A-N, and/or a maximum number of instances 101A-N at a given time. The load balancer 204 may monitor the load (e.g., the amount of processing performed by the host system instances 101A-N, an amount of network traffic handled by the load balancer 204, etc.) of the system to dynamically scale the instances 101A-N to add or remove instances 101A-N as needed. Furthermore, as a user interface 108 of a client device 102 sends requests or other data to the host system instances 101A-N, the load balancer 204 may distribute the requests among each of the host system instances 101A-N to ensure that the load is distributed equally among each instance 101A-N.

The DNS 207 may provide translation services to map domain names to IP addresses or other domain names 206 to allow the user interfaces 108 to access the host system instances 101A-N. The certificate 205 is representative of secure socket layer (SSL) certificates, which provide secure, encrypted communications between the host system instances 101A-N and a client application, such as the user interfaces 108. The lambda functions 208 are anonymous function definitions that are not bound to an identifier. Example lambda functions 208 include functions to copy configuration information (e.g., from the playbook 203), modify container images of the host system 101, modify the launch configuration 202 of the ASG 201, and terminate instances of the host systems 101 A-N.

Figure 3A:

FIG. 3A depicts an example user interface 108, according to one embodiment. Generally, the user interface 108 executes on the client device 102 and depicts an example chatbot interface. As shown, a user of the client device 102 may compose and publish a message "define pa" in a channel of the user interface 108, which is transmitted to the corresponding chatbot user interface 108 of the host system 101. The DBMS 103 may process the term "pa" against the term data 109 as described above to return one or more results. As shown, the results include definitions of "patent application" and "physician assistant," which are outputted for display via the user interface 108. In one embodiment, the user interface 108 may be modified such that the results replace the term "pa" typed by the user.

FIG. 3B depicts an example user interface 108, according to one embodiment. As shown, the user interface 108 outputs an indication that the crawler 107 has identified a new acronym in the domain data 112. For example, the acronym may be identified in a communication channel where inventors are discussing new inventions. As shown, the user interface 108 includes a suggested term 301, a suggested definition 302 for the acronym, and suggested content tags 303-305, each of which is generated by the ML component 105 as described above. Specifically, the suggested term 301 is "patent application," while the definition 302 is "an application for patent filed with a governmental entity." Further still, the user interface 108 includes suggested content tags 303-305 "legal," "invention," and "technology" for the acronym. Generally, a user reviewing the suggested term 301, suggested definition 302, and suggested content tags 303-305 may edit the corresponding data if needed. The user may submit the suggested term 301, suggested definition 302, and suggested content tags 303-305 using the submit button 306. Once submitted, the DBMS 103 may generate a record including indications of the acronym, the term 301, the definition 302, and content tags 303-305 in the term data 109.

Figure 4:
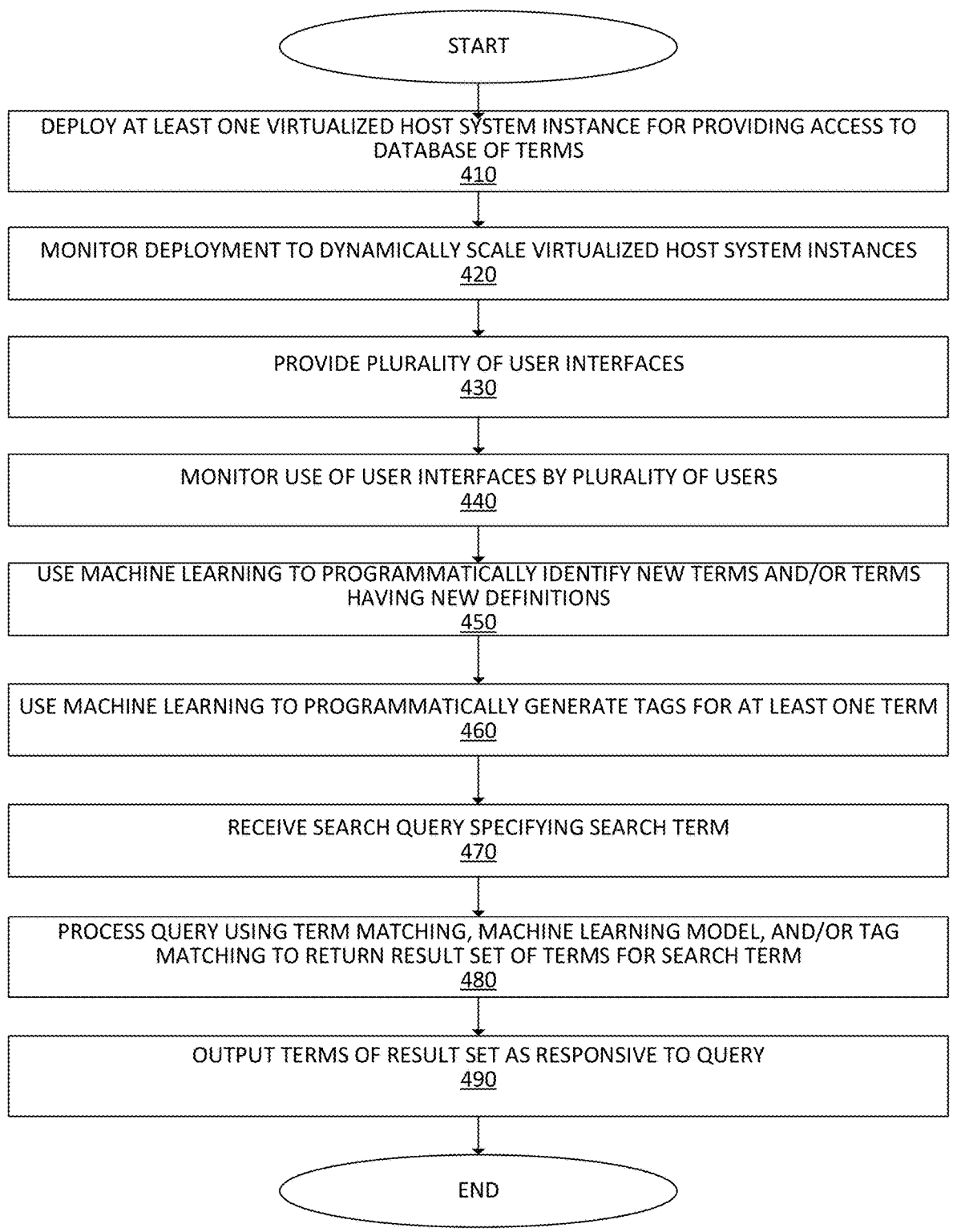
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to deploy an instance of the host system 101 and allow the user interface 108 of the client device 102 to submit a query to the DBMS 103. The DBMS 103 may process the query and returns results to the user interface 108 of the requesting client device 102. Embodiments are not limited in this context.

As shown, the logic flow 400 begins at block 410, where at least one virtualized instance of the host system 101 is deployed (e.g., to the auto-scaling group 201), where the host system 101 provides access to the term data 109. At block 420, the deployment component 104 monitors the deployment of the host system 101 to dynamically scale instances of the host system 101 in the auto-scaling group 201. As stated, the deployment component 104 monitors load to increase instances of the host system 101 in the auto-scaling group 201 during periods of increased load and decrease instances of the host system 101 in the auto-scaling group 201 during periods of decreased load.

At block 430, the plurality of user interfaces 108 are provided to one or more client devices 102. At block 440, the analytics component 106 monitors the use of each user interface 108 by a plurality of different users of the computing devices 102. As stated, the analytics component monitors user interactions with the user interfaces 108 (e.g., queries submitted, definitions provided, etc.) and generates metadata describing the user interactions. At block 450, the ML component 105 and/or the crawler 107 use machine learning to programmatically identify new terms in the domain data 112, and/or identify terms in the term data 109 having new definitions. At block 460, the ML component 105 and/or the crawler 107 uses machine learning to programmatically generate content tags for one or more terms in the term data 109 and/or the terms identified at block 450.

At block 470, the DBMS 103 receives a query specifying a search term from one of the user interfaces 108 of the client device. At block 480, the DBMS 103 uses term matching, content tag matching, and/or a machine learning model from the ML data 111 to process the query to return a result set of terms from the term data 109. At block 490, the DBMS 103 returns the result set to the user interface 108 of the client device 102, which outputs the results from the result set as responsive to the query.

Figure 5:
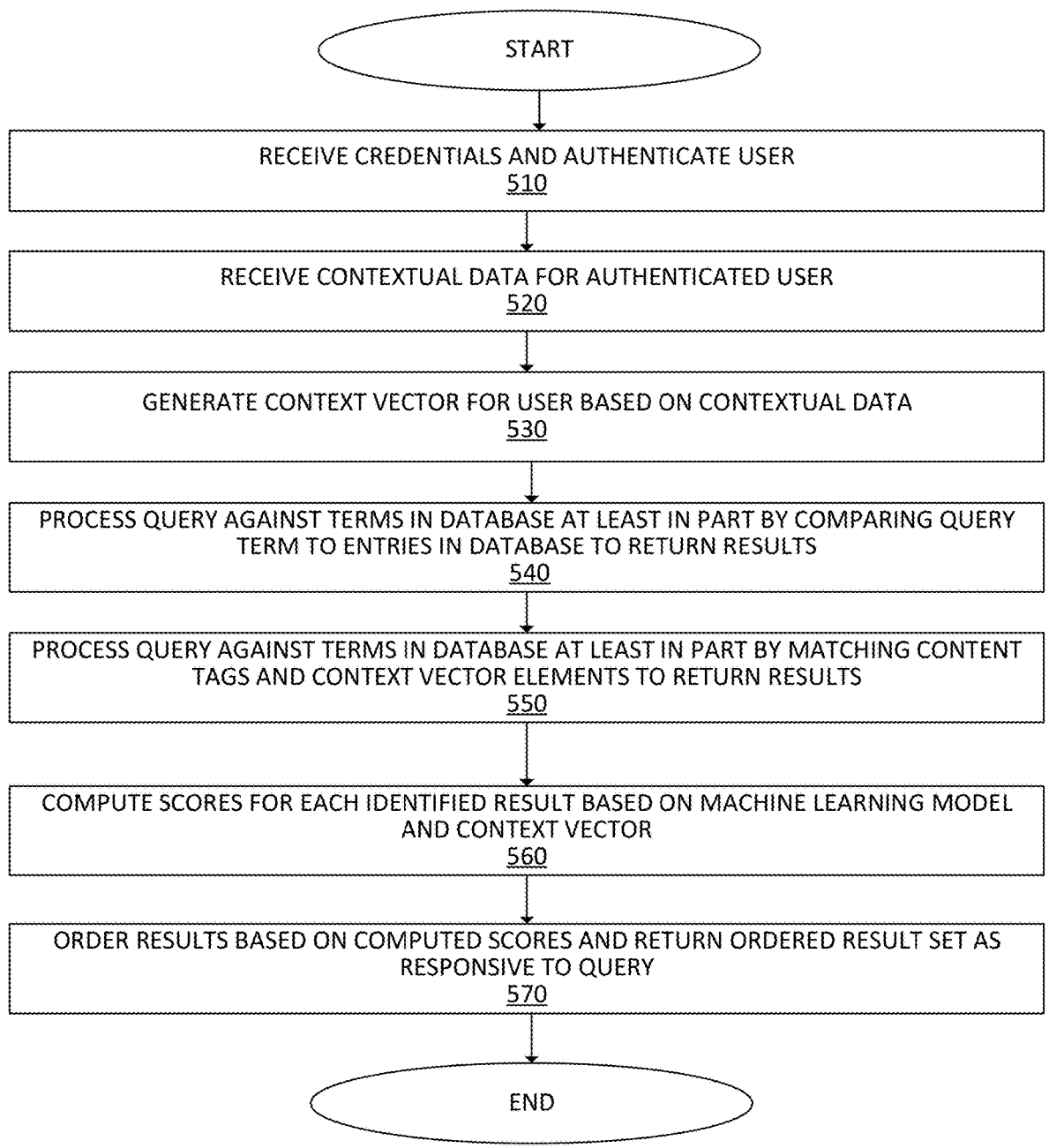
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations to allow the DBMS 103 to perform contextual-based searches based on user queries. Embodiments are not limited in this context.

As shown, at block 510, the DBMS 103 may receive credentials (e.g., a username/password, biometric credentials, etc.) via a user interface 108 and authenticate a user. At block 520, the DBMS 103 may receive contextual data describing the user from the user's profile in the profiles 110. As stated, the contextual data includes biographical data of the user, data describing the user's role, projects, teams, etc., within an organization. At block 530, the DBMS 103 and/or the ML component 105 may generate a context vector for the user based on the contextual data received at block 540.

At block 540, the DBMS 103 processes a query submitted by the user (e.g., at block 470 of logic flow 400) by comparing the query term to the entries in the term data 109. For example, if the search term is "ABC," the DBMS 103 may determine whether any entries in the term data 109 include the term "ABC." Doing so may return one or more results from the term data 109. At block 550, the DBMS 103 may further process the query against the term data 109 by matching content tags of the terms in the term data 109 to the elements of the context vector for the user. Doing so allows context-based results to be returned from the term data 109. For example, if the user submitting the query is a computer programmer, the DBMS 103 may return results similar to "ABC" that are tagged with computer programming-related tags.

At block 560, the ML component 105 may compute a score for each result returned from the term data 109 at blocks 540 and 550. The score may be computed based on an ML model in the ML data 111 and the context vector generated for the user. At block 570, the DBMS 103 may order the results based on the scores computed at block 560 and return the ordered result set as responsive to the query. The results may be transmitted to the requesting client device 102 via the network 130.

Figure 6:
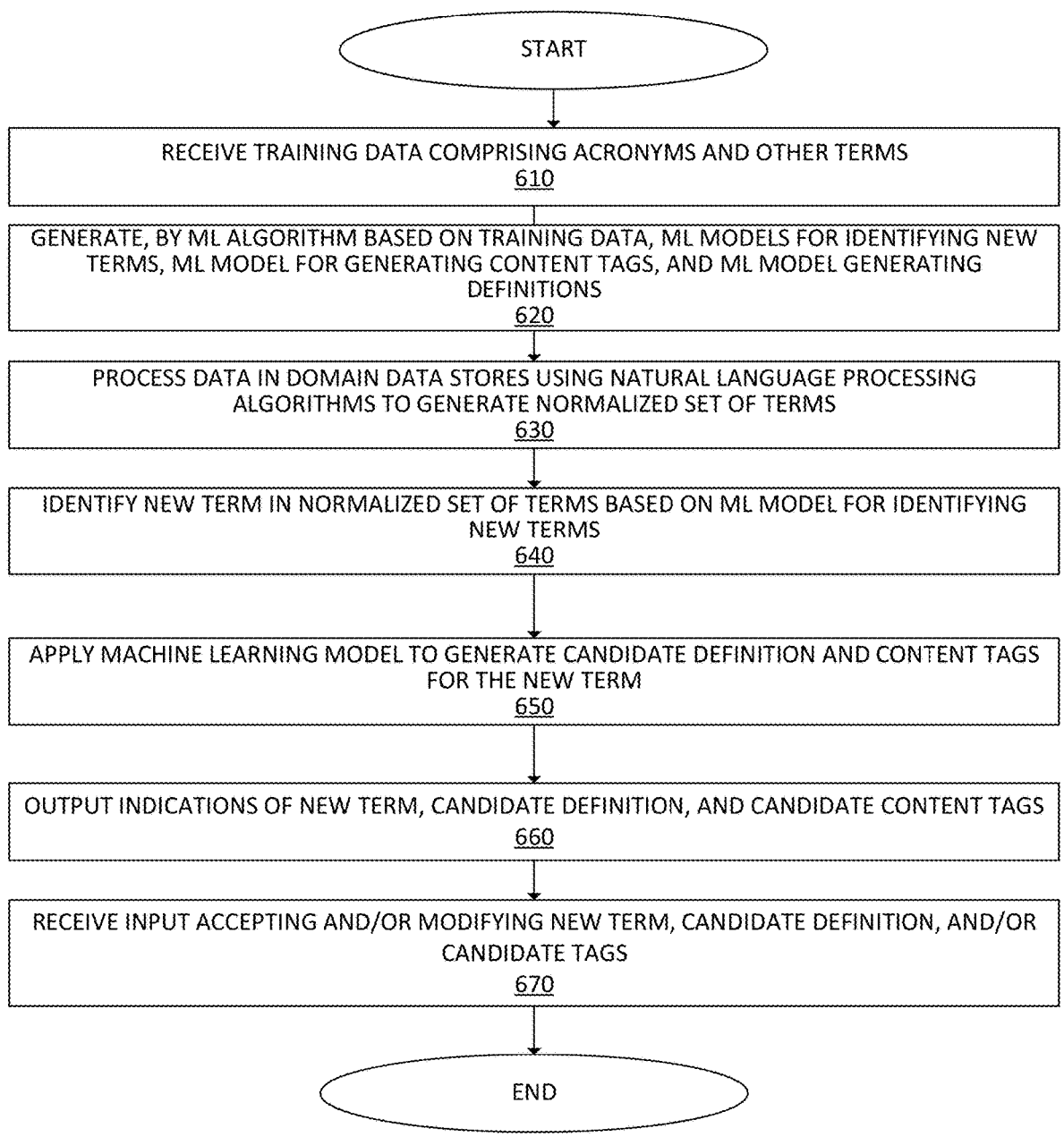
FIG. 6 illustrates an embodiment of a third logic flow.

FIG. 6 illustrates an embodiment of a logic flow 600. The logic flow 600 may be representative of some or all of the operations executed by one or more embodiments described herein. For example, the logic flow 600 may include some or all of the operations to identify new terms in the domain data 112. Embodiments are not limited in this context.

As shown, the logic flow 600 includes block 610, where the ML component 105 may receive training data from the ML data 111. The training data may include acronyms, terms, and the like. At block 620, the ML component 105 may leverage an ML algorithm to generate ML models based on the training data received at block 610. The ML models include ML models specifying weights used to identify new terms in the domain data 112 (or terms having new definitions), ML models specifying weights to generate definitions for identified terms, and/or ML models for generating content tags for the terms.

At block 630, the crawler 107 may process the data in the domain data 112 using NLP algorithms to generate a normalized set of candidate terms. At block 640, the ML component 105 may identify a new term in the normalized set of terms based on the ML model generated at block 620. At block 650, the ML component 105 may use an ML model for generating definitions and/or content tags to generate a candidate definition for the identified new term and candidate content tags for the identified new term. The candidate definition may include an unabbreviated form of the term (if the term is an acronym) and a definition of the term. At block 660, the user interface 108 may output an indication of the new term, candidate definition, and candidate content tags for display. An example of such an output is depicted in FIG. 3B. At block 670, a user may provide input modifying and/or accepting the new term, candidate definition, and candidate tags outputted at block 660. Once accepted, the DBMS 103 may store the data in a record in the term data 109.

Figure 7:
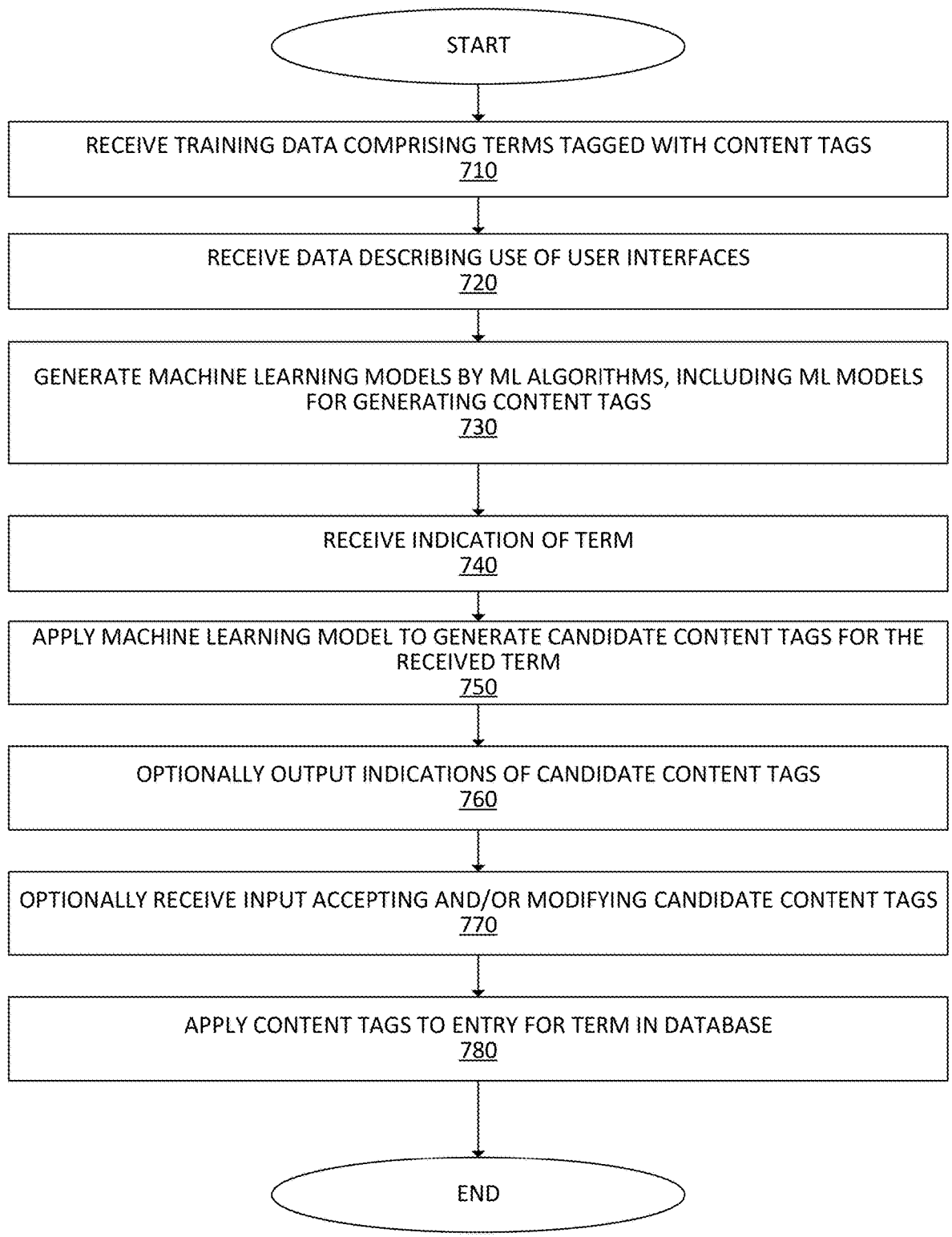
FIG. 7 illustrates an embodiment of a fourth logic flow.

FIG. 7 illustrates an embodiment of a logic flow 700. The logic flow 700 may be representative of some or all of the operations executed by one or more embodiments described herein. For example, the logic flow 700 may include some or all of the operations performed by the ML component 105 to generate content tags for terms in the term data 109. Embodiments are not limited in this context.

At block 710, the ML component 105 receives training data from the ML data 111. The training data may include terms from the term data 109 that have been tagged with content tags as classification data. The content tags may include manually generated content tags. At block 720, the ML component 105 receives data from the analytics component 106. The data may describe the use of the user interfaces 108 by a plurality of users. At block 730, the ML component 105 applies one or more ML algorithms to generate one or more ML models. The generated ML models may include ML models for generating content tags.

At block 740, the ML component 105 may receive an indication of a term. The term may be a term in the term data 109, and/or a term identified as a new term in the domain data 112. At block 750, the ML component 105 uses the ML models generated at block 730 to generate one or more candidate content tags for the received term. At block 760, an indication of the candidate content tags may be outputted for review by a user. At block 770, the user may optionally provide input accepting and/or modifying the candidate content tags. At block 780, the DBMS 103 may apply the content tags to the entry for the term in the term data 109. In one embodiment, blocks 760-770 are skipped, and the DBMS 103 applies the tags without requiring user review.

Figure 8:
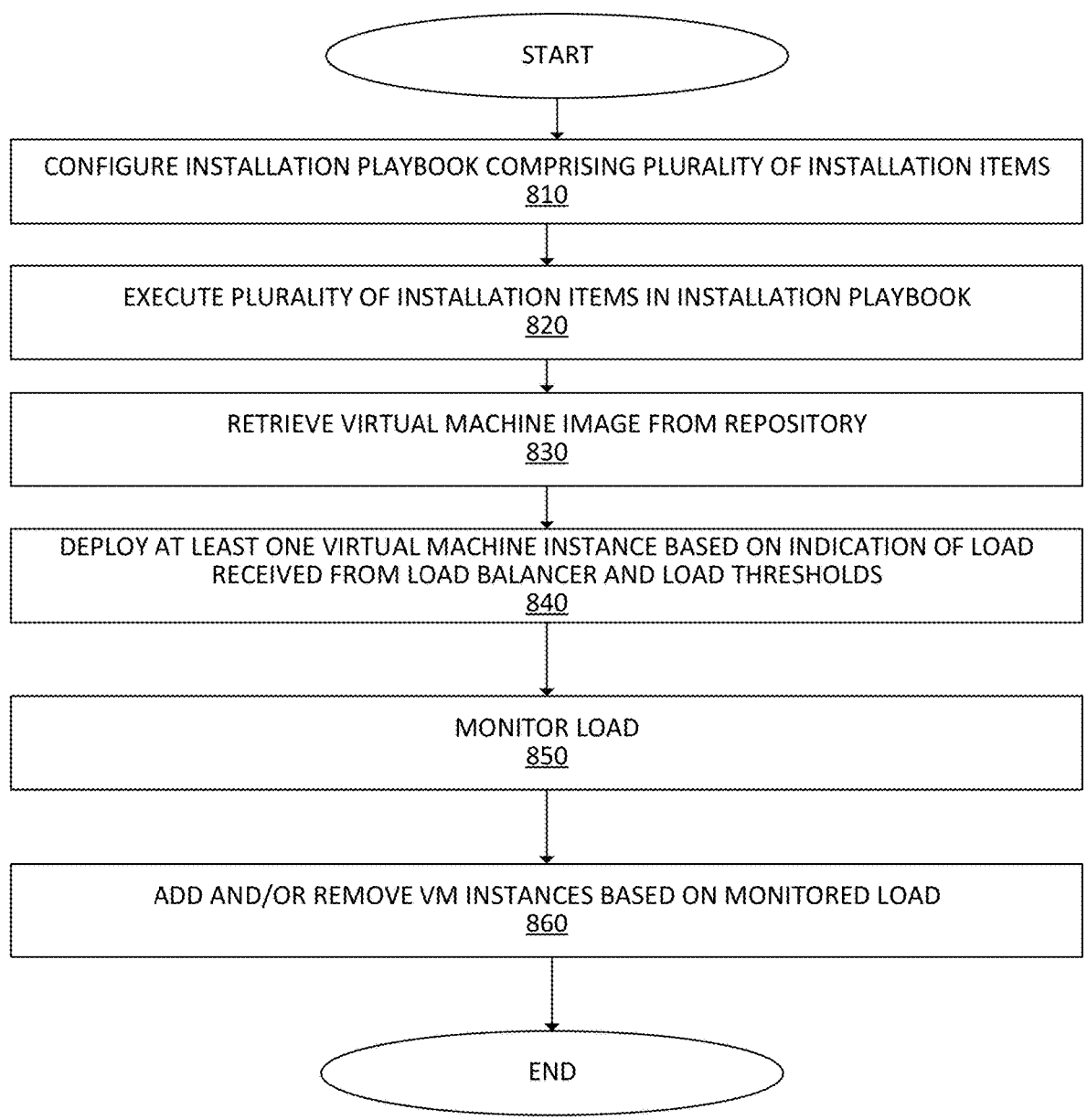
FIG. 8 illustrates an embodiment of a fifth logic flow.

FIG. 8 illustrates an embodiment of a logic flow 800. The logic flow 800 may be representative of some or all of the operations executed by one or more embodiments described herein. For example, the logic flow 800 may include some or all of the operations to dynamically scale instances of the host system 101 in the auto-scaling group 201. Embodiments are not limited in this context.

At block 810, the logic flow may include configuring an installation playbook 203 comprising a plurality of installation items. For example, a user may configure the installation playbook 203 to detail the steps required to deploy an instance of the host system 101 in the auto-scaling group 201. At block 820, the launch component 202 executes the installation items in the installation playbook 203. One example installation item is depicted in block 830, which comprises retrieving a virtual machine image of the host system 101 from a repository.

At block 840, at least one instance of the virtual machine image of the host system 101 is deployed on a compute system in the auto-scaling group 201. The number of instances deployed may be based on indications of system load received from the load balancer 204 relative to one or more load-balancing thresholds. For example, the load-balancing thresholds may specify ranges of submitted queries. The load balancer 204 may indicate a current number of queries being submitted by users via the user interfaces 108. The deployment component 104 may select the number of virtual machine instances of the host system 101 based on the associated range for the current number of queries reported by the load balancer 204. At block 850, the load balancer 204 may monitor the load (e.g., the number of queries submitted by users). At block 860, the deployment component 104 may add or remove instances of the host system 101 from the auto-scaling group 201 as the load increases or decreases, respectively.

Figure 9:
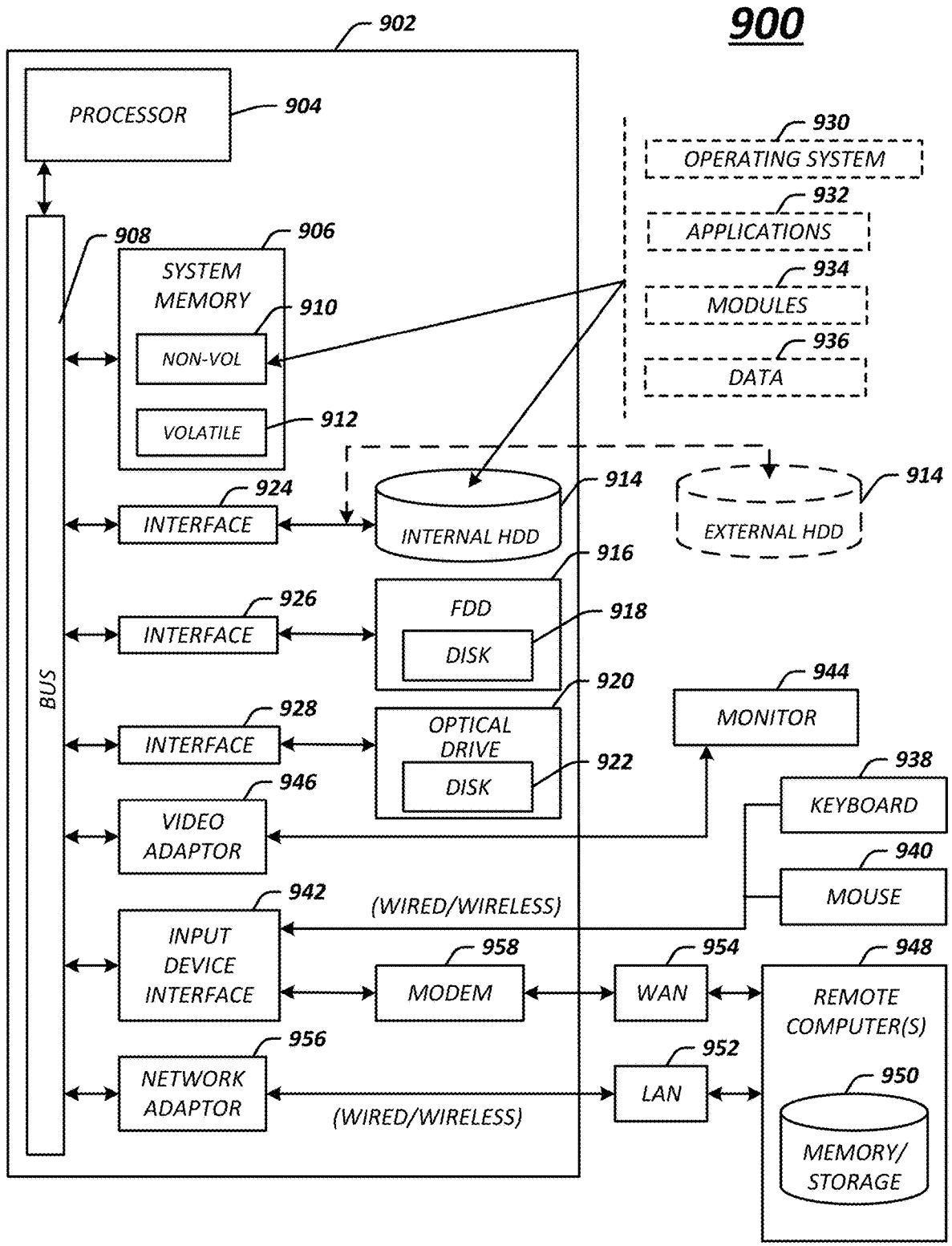
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the host system 101 and client device 102 of the system 100. The embodiments are not limited in this context. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the DBMS 103, deployment component 104, ML component 105, analytics component 106, crawler 107, user interfaces 108, term data 109, profiles 110, ML data 111, and domain data 112.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
a computer processor; and
a memory storing instructions which when executed by the processor to cause the processor to:
receive, from a user interface, a query specifying an acronym, the query associated with an account;
process, by a database management system (DBMS), the query against a database to generate a result set, the query processed based at least in part on elements of a context vector of the account and a plurality of content tags applied to each of a plurality of entries in the database;

return, by the DBMS, results of the result set as responsive to the query, each result in the result set comprising a respective definition for the acronym;
receive classification data comprising a subset of the plurality of content tags;
receive learning data describing use of a plurality of user interfaces including the user interface;
generate at least one new content tag for at least one of the plurality of entries in the database by a machine learning (ML) algorithm based on the classification data, the learning data, and a ML model;
apply the generated at least one new content tag to the at least one of the plurality of entries in the database; and
process another query based at least in part on the at least one new content tag, the another query comprising another acronym.

2. The system of claim 1, the memory storing instructions which when executed by the processor to cause the processor to:
process a corpus of text using one or more natural language processing algorithms to extract a normalized set of terms from the corpus;
identify, by the ML algorithm based on the normalized set of terms and a second ML model generated based on a training dataset, a new acronym not having an entry in the database;
output an indication of the new acronym; and
responsive to receiving approval of the new acronym, add an entry for the new acronym to the database.

3. The system of claim 2, the memory storing instructions which when executed by the processor to cause the processor to:
generate, based on the second ML model, a candidate definition and a candidate tag for the new acronym;
output an indication of the candidate definition and the candidate tag for review; and
receive input modifying the candidate definition and the candidate tag, wherein the entry for the new acronym in the database comprises the modified candidate definition and the modified candidate tag.

4. The system of claim 1, the memory storing instructions which when executed by the processor to cause the processor to:
receive, via an application programming interface (API), contextual data associated with the account, the contextual data comprising indications of a role of a user submitting the query and membership of the user within an organizational unit;
generate the context vector based on the contextual data;
compute, by the DBMS, a score for each result in the result set based on the ML model and the context vector; and
order, by the DBMS, the results in the result set based on the computed scores, the DBMS to return the ordered results in the result set as responsive to the query.

5. The system of claim 1, the learning data comprising: (i) a frequency of use of each of the plurality of user interfaces, (ii) a type of each query received via the plurality of user interfaces, (iii) a role of users submitting queries via the plurality of user interfaces, and (iv) an organizational unit the users submitting queries are members of, the query processed based at least in part on matching elements of the context vector and the plurality of content tags.

6. The system of claim 1, the content tags comprising: (i) one or more organizational units associated with the entry in the database, (ii) one or more roles associated with the entry in the database, (iii) a context associated with the entry in the database, (iv) one or more projects associated with the entry in the database, (v) a privacy level of the entry in the database, and (vi) a security level required to access the entry in the database.

7. The system of claim 1, wherein the elements of the context vector comprise indications of: (i) an account identifier of the account, (ii) a role of a user associated with the account, (iii) an organizational unit of the user, (iv) a team of the user, (v) a project of the user, (vi) a privacy level of the acronym, (vii) a security level of the user, (viii) a skill of the user, (ix) a location of the user, and (x) a communications network a device providing the user interface is connected to, wherein the plurality of user interfaces comprise: (i) a web page, (ii) a web browser extension, (iii) a mobile operating system application, (iv) a chat interface, and (v) a desktop operating system application.

8. A non-transitory computer-readable storage medium storing computer-readable program code, the computer-readable program code executable by a processor to:
receive, from a user interface, a query specifying an acronym, the query associated with an account;
process, by a database management system (DBMS), the query against a database to generate a result set, the query processed based at least in part on elements of a context vector of the account and a plurality of content tags applied to each of a plurality of entries in the database;
return, by the DBMS, results of the result set as responsive to the query, each result in the result set comprising a respective definition for the acronym;
receive classification data comprising a subset of the plurality of content tags;
receive learning data describing use of a plurality of user interfaces including the user interface;
generate at least one new content tag for at least one of the plurality of entries in the database by a machine learning (ML) algorithm based on the classification data, the learning data, and a ML model;
apply the generated at least one new content tag to the at least one of the plurality of entries in the database; and
process another query based at least in part on the at least one new content tag, the another query comprising another acronym.

9. The non-transitory computer-readable storage medium of claim 8, the computer-readable program code executable by the processor to:
process a corpus of text using one or more natural language processing algorithms to extract a normalized set of terms from the corpus;
identify, by the ML algorithm based on the normalized set of terms and a second ML model generated based on a training dataset, a new acronym not having an entry in the database;
output an indication of the new acronym; and
responsive to receiving approval of the new acronym, add an entry for the new acronym to the database.

10. The non-transitory computer-readable storage medium of claim 9, the computer-readable program code executable by the processor to:
generate, based on the second ML model, a candidate definition and a candidate tag for the new acronym;
output an indication of the candidate definition and the candidate tag for review; and
receive input modifying the candidate definition and the candidate tag, wherein the entry for the new acronym in the database comprises the modified candidate definition and the modified candidate tag.

11. The non-transitory computer-readable storage medium of claim 8, the computer-readable program code executable by the processor to:
receive, via an application programming interface (API), contextual data associated with the account, the contextual data comprising indications of a role of a user submitting the query and membership of the user within an organizational unit;
generate the context vector based on the contextual data;
compute, by the DBMS, a score for each result in the result set based on the ML model and the context vector; and
order, by the DBMS, the results in the result set based on the computed scores, the DBMS to return the ordered results in the result set as responsive to the query.

12. The non-transitory computer-readable storage medium of claim 8, the learning data comprising: (i) a frequency of use of each of the plurality of user interfaces, (ii) a type of each query received via the plurality of user interfaces, (iii) a role of users submitting queries via the plurality of user interfaces, and (iv) an organizational unit the users submitting queries are members of, the query processed based at least in part on matching elements of the context vector and the plurality of content tags.

13. The non-transitory computer-readable storage medium of claim 8, the content tags comprising: (i) one or more organizational units associated with the entry in the database, (ii) one or more roles associated with the entry in the database, (iii) a context associated with the entry in the database, (iv) one or more projects associated with the entry in the database, (v) a privacy level of the entry in the database, and (vi) a security level required to access the entry in the database.

14. The non-transitory computer-readable storage medium of claim 8, wherein the elements of the context vector comprise indications of: (i) an account identifier of the account, (ii) a role of a user associated with the account, (iii) an organizational unit of the user, (iv) a team of the user, (v) a project of the user, (vi) a privacy level of the acronym, (vii) a security level of the user, (viii) a skill of the user, (ix) a location of the user, and (x) a communications network a device providing the user interface is connected to, wherein the plurality of user interfaces comprise: (i) a web page, (ii) a web browser extension, (iii) a mobile operating system application, (iv) a chat interface, and (v) a desktop operating system application.

15. A method, comprising:
receiving, from a user interface, a query specifying an acronym, the query associated with an account;
processing, by a database management system (DBMS) executing on a processor, the query against a database to generate a result set, the query processed based at least in part on elements of a context vector of the account and a plurality of content tags applied to each of a plurality of entries in the database;
returning, by the DBMS, results of the result set as responsive to the query, each result in the result set comprising a respective definition for the acronym;
receiving classification data comprising a subset of the plurality of content tags;
receiving learning data describing use of a plurality of user interfaces including the user interface;
generating at least one new content tag for at least one of the plurality of entries in the database by a machine learning (ML) algorithm based on the classification data, the learning data, and a ML model;
applying the generated at least one new content tag to the at least one of the plurality of entries in the database; and
processing another query based at least in part on the at least one new content tag, the another query comprising another acronym.

16. The method of claim 15, further comprising:
processing a corpus of text using one or more natural language processing algorithms to extract a normalized set of terms from the corpus;
identifying, by the ML algorithm based on the normalized set of terms and a second ML model generated based on a training dataset, a new acronym not having an entry in the database;
outputting an indication of the new acronym; and
responsive to receiving approval of the new acronym, adding an entry for the new acronym to the database.

17. The method of claim 16, further comprising:
generating, by the processor based on the second ML model, a candidate definition and a candidate tag for the new acronym;
outputting, by the processor, an indication of the candidate definition and the candidate tag for review; and
receiving, by the processor, input modifying the candidate definition and the candidate tag, wherein the entry for the new acronym in the database comprises the modified candidate definition and the modified candidate tag.

18. The method of claim 17, further comprising:
receiving, by the processor via an application programming interface (API), contextual data associated with the account, the contextual data comprising indications of a role of a user submitting the query and membership of the user within an organizational unit;
generating, by the processor, the context vector based on the contextual data;
computing, by the DBMS, a score for each result in the result set based on the ML model and the context vector; and
ordering, by the DBMS, the results in the result set based on the computed scores, the DBMS to return the ordered results in the result set as responsive to the query.

19. The method of claim 15, the learning data comprising: (i) a frequency of use of each of the plurality of user interfaces, (ii) a type of each query received via the plurality of user interfaces, (iii) a role of users submitting queries via the plurality of user interfaces, and (iv) an organizational unit the users submitting queries are members of, the query processed based at least in part on matching elements of the context vector and the plurality of content tags.

20. The method of claim 15, the content tags comprising: (i) one or more organizational units associated with the entry in the database, (ii) one or more roles associated with the entry in the database, (iii) a context associated with the entry in the database, (iv) one or more projects associated with the entry in the database, (v) a privacy level of the entry in the database, and (vi) a security level required to access the entry in the database.

* * * * *